US007668185B2

(12) United States Patent
Hibino et al.

(10) Patent No.: US 7,668,185 B2
(45) Date of Patent: Feb. 23, 2010

(54) DISTRIBUTION APPARATUS, RECEIVING APPARATUS TREE-TYPE DISTRIBUTION SYSTEM, AND INFORMATION PROCESSING METHOD ETC.

(75) Inventors: Yoshihiko Hibino, Hashima-gun (JP); Yuji Kiyohara, Nagoya (JP); Hiroaki Suzuki, Nagoya (JP); Kentaro Ushiyama, Nagoya (JP); Koichi Iijima, Higashikurume (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 379 days.

(21) Appl. No.: 11/652,530

(22) Filed: Jan. 12, 2007

(65) Prior Publication Data
US 2007/0130314 A1 Jun. 7, 2007

Related U.S. Application Data

(63) Continuation-in-part of application No. PCT/JP2005/010519, filed on Jun. 8, 2005.

(30) Foreign Application Priority Data

Jul. 13, 2004 (JP) ............................. 2004-205497
Aug. 25, 2004 (JP) ............................. 2004-245180

(51) Int. Cl.
 *H04L 12/28* (2006.01)
 *G06F 15/16* (2006.01)
 *G06F 17/30* (2006.01)
(52) U.S. Cl. ...................... 370/408; 709/231; 709/246; 707/10
(58) Field of Classification Search ....................... None
 See application file for complete search history.

(56) References Cited

U.S. PATENT DOCUMENTS

2004/0233847 A1* 11/2004 Park et al. .................. 370/235

2006/0045110 A1* 3/2006 Miura et al. ................ 370/408

FOREIGN PATENT DOCUMENTS

| JP | A 58-14654 | 1/1983 |
| JP | A 2-127839 | 5/1990 |
| JP | A 3-106141 | 5/1991 |
| JP | A 11-215176 | 8/1999 |
| JP | A 2001-177533 | 6/2001 |
| JP | A 2002-342240 | 11/2002 |
| JP | A 2003-169089 | 6/2003 |

* cited by examiner

*Primary Examiner*—Pankaj Kumar
*Assistant Examiner*—Hicham B Foud
(74) *Attorney, Agent, or Firm*—Oliff & Berridge, PLC

(57) ABSTRACT

It is the object of the present invention to provide a processing apparatus, a tree-type network system, processing program and recording method that are capable of performing requests to a higher-order apparatus at the same time, while reducing the load that is concentrated in the communication path upstream in the network. One node apparatus which is provided with tree-type network system including broadcasting apparatus sending inquiry information as request-reception-begin data etc. for requesting sending response message as select-node information etc. to a plurality of node apparatus, receiving inquiry information that is sent from other processing apparatus that is connected in a higher-order layer above the processing apparatus, transferring to other processing apparatuses that are connected in a lower-order layer below the processing apparatus, receiving the reply-result information that is sent from other processing apparatus, creating its reply-result information based on own processing apparatus, and replying created reply-result information based on reply information included in reply-result-information and created reply information to other processing apparatus that is connected in a higher-order layer.

10 Claims, 9 Drawing Sheets

FIG. 7

| TOTAL-NUMBER INFORMATION | SELECT-NODE INFORMATION |
|---|---|
| TOTAL-NUMBER INFORMATION N(1) | SELECT-NODE INFORMATION X(1) |
| TOTAL-NUMBER INFORMATION N(2) | SELECT-NODE INFORMATION X(2) |
| TOTAL-NUMBER INFORMATION N(3) | SELECT-NODE INFORMATION X(3) |
| TOTAL-NUMBER INFORMATION N(4) | SELECT-NODE INFORMATION X(4) |
| ⋮ | ⋮ |
| TOTAL-NUMBER INFORMATION N(k) | SELECT-NODE INFORMATION X(k) |

DISTRIBUTION APPARATUS, RECEIVING APPARATUS TREE-TYPE DISTRIBUTION SYSTEM, AND INFORMATION PROCESSING METHOD ETC.

BACKGROUND OF THE INVENTION

1. Field of the Invention

This invention relates to a processing apparatus or the like in a Peer-to-Peer (P2P) type network system that transmits reply information to a highest-order apparatus in response to an inquiry from that highest-order apparatus.

2. Discussion of the Related Art

This system is a so-called Peer-to-Peer type data contents distribution system, and it differs from a client-server type data contents distribution system in that data contents that are distributed by streaming are transmitted or received between node apparatuses as clients.

A distribution system for stream data is disclosed in patent document 1 as an example of this kind of system, and in that system, each node apparatus has topology information for identifying the network connection relationship, and by using the topology information, each node apparatus is able to connect to an identified upstream (higher-order) node apparatus, receive stream data that is transmitted from that upstream node apparatus, and transfer (relay) that stream data to a downstream (lower-order) node apparatus. By doing this, it is possible to prevent access from being concentrated on a certain computer such as a server.

[Patent Document 1]
Japanese patent application 2003-169089

DISCLOSURE OF THE INVENTION

Problems to be Solved by the Invention

Also, as the problem to be solved, when this kind of computer-network system is applied to a request procedure in which a broadcasting apparatus sends request-reception information to downstream node apparatuses, and the downstream node apparatuses send requests all together to the broadcasting apparatus, in the case where the broadcasting apparatus and node apparatuses form a wide IP (Internet Protocol) network and the downstream nodes send requests to the broadcasting apparatus at the same time, problems occur in that a large communication load occurs in the upstream (higher-order) communication path of the IP network, the network load becomes large (in other words, the frequency that the upstream IP routers and communication lines of the network are used becomes high), and the processing load by the upstream node apparatuses becomes large.

SUMMARY OF THE INVENTION

Also, taking the aforementioned problem into consideration, it is the object of the present invention to provide a processing apparatus, a tree-type network system, processing program and recording method that are capable of performing requests to a higher-order apparatus at the same time, while reducing the load that is concentrated in the communication path upstream in the network, and at an upstream node apparatus.

The present invention recited in claim 1 for solving the problems is directed to a processing apparatus in a tree-type network system that is provided with an inquiry apparatus that sends inquiry information requesting that reply-result information be sent, and a plurality of processing apparatuses that receive the inquiry information, where the inquiry apparatus is connected to the plurality of processing apparatuses in a tree shape via communication paths so that the inquiry apparatus is the highest and the plurality of processing apparatuses form a plurality of layers, and the inquiry information that is sent from the inquiry apparatus is successively transferred from the processing apparatuses in a higher order to the processing apparatuses in a lower order, wherein one of the processing apparatuses is provided with: an inquiry-information-receiving means for receiving the inquiry information that is sent from another processing apparatus that is connected in a higher-order layer above the processing apparatus or from the inquiry apparatus; an inquiry-information-transfer means for transferring the received inquiry information to one or more of the other processing apparatuses that are connected in a lower-order layer below the processing apparatus; a reply-result-information-receiving means for receiving the reply-result information that includes reply information for the inquiry information and that is sent from at least one or more of the other processing apparatuses that are connected in the lower-order layer; a reply-information-creation means for the processing apparatus to create its own the reply-result information for the inquiry information; a reply-result-information-creation means for the processing apparatus to create its own reply-result information based on reply-result information received by the reply-result-information-receiving means, and reply information created by the reply-information-creation means; and a reply-result-information-reply means for sending the created reply-result information to another processing apparatus or inquiry apparatus that is connected in a higher-order layer and that is the transmission source of inquiry information that was received by the inquiry-information-receiving means.

Accordingly, construction is such that new reply-result information is created based on the reply-result information that is sent from processing apparatuses that are connected in the lower-order layer directly below, and then sent to the higher-order layer, so it is possible to reduce the concentration of loads in the upstream communication paths of a network (for example, a certain IP router, etc.), and thus it is possible to improve the operating efficiency of the system.

BRIEF DESCRIPTION OF THE DRAWINGS

FIG. 7 is a drawing explaining the total-number information and select-node information that is stored in a memory unit 222 of a node apparatus 202.

EXPLANATION OF LETTERS OR NUMERALS

Figure 1:
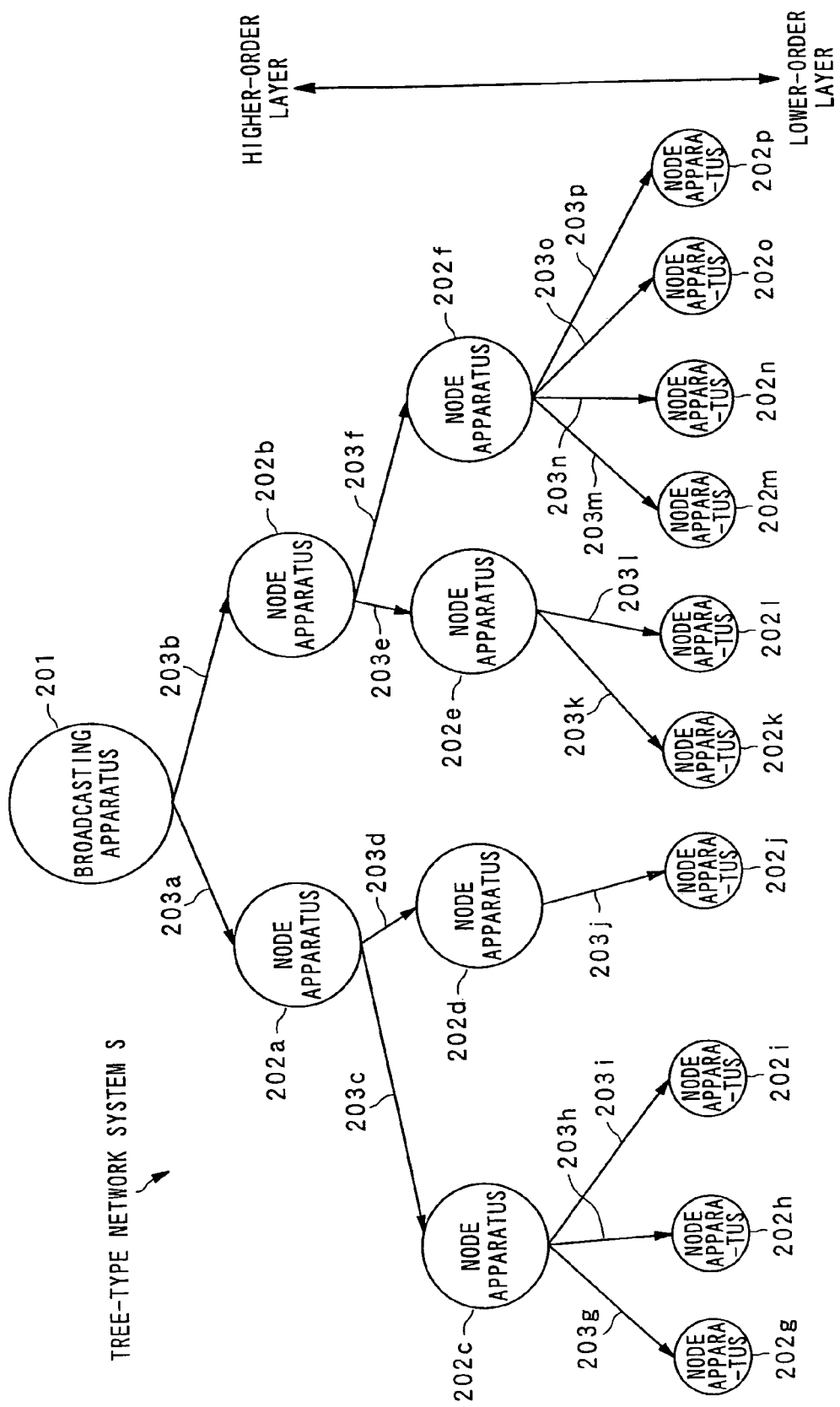
FIG. 1 is a block diagram showing the construction of a tree-type network system S in the embodiment.

201 . . . Broadcasting apparatus
202 (202a,202b,202c,202d,202e,202f,202g,202h,202i,202j, 202k,202l,202m, 202n,202o,202p) . . . Node apparatus
203 (203a,203b,203c,203d,203e,203f,203g,203h,203i,203j, 203k,203l,203m, 203n,203o,203p) . . . Communication path
211 . . . Control unit
212 . . . Memory unit
213 . . . Operation-input unit
214 . . . Encoder unit
215 . . . Communication unit
216 . . . Bus
221 . . . Control unit
222 . . . Memory unit
223 . . . Buffer memory
224 . . . Decoder unit
225 . . . Video-processing unit
226 . . . Audio-processing unit
227 . . . Operation-input unit
228 . . . Communication unit
229 . . . Bus
M . . . Display unit
U . . . Speakers
Rb . . . Request-reception-begin data
Re . . . Request-reception-end data
X . . . Select-node information
N . . . Total-number information
Ans . . . Reply-result information
Tr . . . Request-possible period
To . . . Timeout time
M . . . Total number of apparatuses
Su . . . Number of node apparatuses 202 connected in the lower-order layer directly below

DETAILED DESCRIPTION OF THE PREFERRED EMBODIMENTS

The Embodiment

The embodiment of the invention will be explained below based on the drawings. The embodiment explained below is an embodiment in which the present invention is applied to a computer-network system.

[Construction of a Tree-type Network System]

First, FIG. 1 will be used to explain the construction of the tree-type network system of the preferred embodiment.

FIG. 1 is a drawing explaining an example of the connected state of each of the apparatuses in the tree-type network system of the embodiment. The example shown in FIG. 1 shows an electrically connected state between each of the apparatuses in the tree-type network system S (for example, the connection relationship such as between which apparatuses communication is established).

As shown in FIG. 1, this tree-type network system S is a Peer-to-Peer (P2P) type network system that comprises a broadcasting apparatus 201 as an example of an inquiring apparatus that transmits (distributes) request-reception-begin data Rb as inquiry information, and a plurality of node apparatuses (peers) 202a, 202b, 202c, . . . , 202p as an example of a plurality of processing apparatuses that receive the aforementioned request-reception-begin data Rb.

As shown in FIG. 1, in the tree-type network system S there is a plurality of layers with a broadcasting apparatus 201 being the highest layer, and a plurality of node apparatuses 202a to 202p, that are connected in a tree shape via a plurality of communication paths 203a, 203b, 203c, 203p according to the respective IP addresses.

Also, the various data that is distributed by the broadcasting apparatus 201 is transferred in order from the higher-order node apparatuses such as 202a and 202b to the lower-order node apparatuses such as 202g to 202p. In the explanation below, for convenience when indicating any one of the node apparatuses 202a to 202p, the node apparatus may be simply referred to as node apparatus 202.

The broadcasting apparatus 201 and plurality of node apparatuses 202a to 202p are physically connected to a network such as the Internet that comprises apparatuses that are located at providers such as IX (Internet Exchange), ISP (Internet Service Provider), DSL (Digital Subscriber Line), apparatuses that are located at FTTH (Fiber to the House) line providers, and communication lines such as telephone lines, optical cable or the like, and the broadcasting apparatus 201 and each of the node apparatuses 202a to 202p are assigned with its own unique apparatus ID and IP (Internet Protocol) address.

[Construction and Function of the Broadcasting Apparatus]

Figure 2:
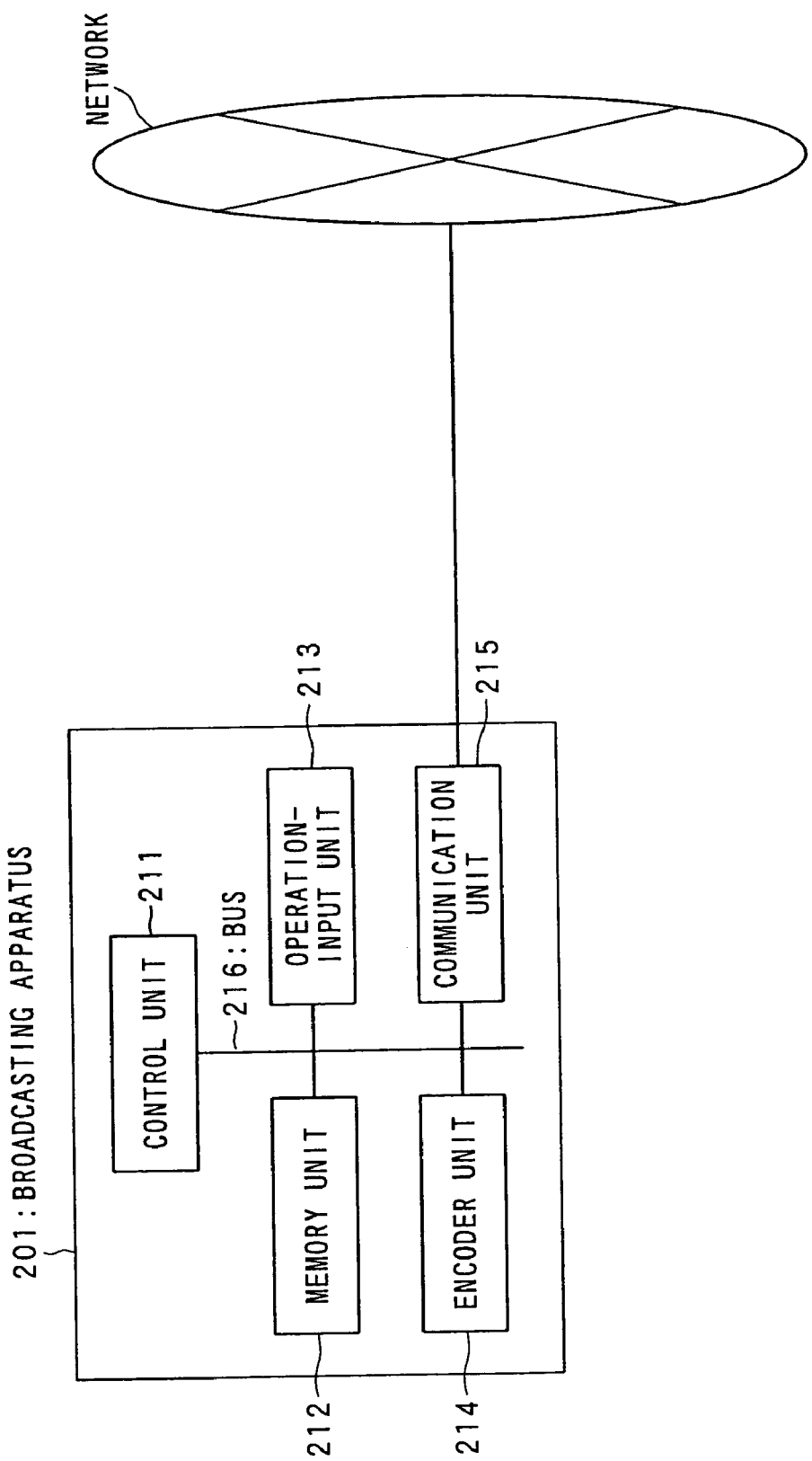
FIG. 2 is a drawing explaining the construction of a broadcasting apparatus 201.

Next, FIG. 2 will be used to explain the construction and function of the broadcasting apparatus 201.

FIG. 2 is a drawing explaining the construction of the broadcasting apparatus 201.

As shown in FIG. 2, the broadcasting apparatus 201 comprises: a control unit 211 of a computer that comprises a CPU (Central Processing Unit) that has a computational function, RAM (Random-Access Memory) for work, and ROM (Read-Only Memory) for storing various data and programs; a memory unit 212 that comprises a HDD (Hard Disc Drive) or the like that stores various data, tables and programs; an operation-input unit 213 for giving instruction to send request-reception data; an encoder unit 214 that encodes (data compression, encoding, etc.) video data (video information) and audio data (audio information) that are included in the request-reception data; and a communication unit 215 for performing communication control of communication over the network with node apparatuses 202; where each of these components is connected to each other via a bus 216. Also, by executing programs that are stored in ROM or the like, the control unit 211 functions as inquiry-information-transmission means and reply-result-information-receiving means of the present invention.

The request-reception data is either request-reception-begin data Rb or request-reception-end data Re, and is created, for example, by an operator such as a disc jockey, who operates the broadcasting apparatus 201 by operating the operation-input unit 213. More specifically, the operator creates request-reception-begin data Rb such as 'Viewers (or listeners) with a request, please press the request button', as video data or as multimedia data that also includes audio data, and after attaching an ID code that indicates the beginning of receiving request input, saves the data in the memory unit 212. Also, the operator creates request-reception-end data Re such as 'Receiving requests has ended. Thank you!' as video data or audio data, and after attaching an ID code that indicates the end of receiving request input, saves the data in the memory unit 212.

The method for attaching the aforementioned ID code can be any method as long as the ID code can be identified by a node apparatus; for example, in the case of performing encoding using MPEG (Moving Picture Experts Group) format, the ID code can be entered in the user data portion of the sequence layer.

Also, when the operator operates the operation-input unit 213 and gives an instruction to send either request-reception-begin data Rb or request-reception-end data Re, the CPU in the control unit 211 executes a program that is stored in the memory unit 212, and in doing so, the control unit 211 reads the request-reception-begin data Rb or request-reception-end data Re that is stored in the memory unit 212, then has the encoder unit 214 encode the video data and/or audio data that is included in that data and transmits that data via the communication unit 215 to node apparatuses 202 (node apparatuses 202a and 202b in the example shown in FIG. 1). The node apparatuses 202 determine whether the data is request-reception-begin data Rb or request-reception-end data Re according to the ID data that is attached to that data.

Also, the communication unit 215 has various communication functions such as packet processing, UDP processing, data-link processing, physical-layer processing and the like, and after the request-reception data has been put into packets and the IP address of the node apparatus 202 that is the transmission destination has been attached to each packet header, it is sent from the communication unit 215.

The IP addresses of the node apparatuses 202 that are the transmission destinations (in the example of the tree-type network system S shown in FIG. 1, these are the IP addresses of node apparatuses 202a and 202b that are connected in the lower-order layer directly below) are such that they are acquired according to control from the control unit 211 by referencing a connection-state table that is stored in the memory unit 212.

The processing for sending (transferring) the request-reception data will be described in more detail later.

Moreover, the control unit 211 functions together with the communication unit 215 as a reply-result-information-receiving means that receives reply-result information Ans from the node apparatuses (node apparatuses 202a and 202b in the example shown in FIG. 1) that are connected in the lower-order layer directly below.

This reply-result information Ans includes select-node information X, and total-number information N, which indicates the select-node information X from among that select-node information X that was selected, as an example of the reply information in this invention. Here, the select-node information X is information that indicates one of the node apparatuses that was selected from among the node apparatuses downstream of the node apparatuses 202 and the node apparatuses 202 themselves that are connected in the lower-order layer directly below, and it includes ID-number information that was given to each of the node apparatuses 202 for identifying the apparatuses.

When the communication unit 215 receives reply-result information Ans from each of the respective node apparatuses 202 that are connected in the lower-order layer directly below, it selects according to control from the control unit 211 one of the items of select-node information X from among each item of select-node information X that is included in the received reply-result information Ans. When doing this, it selects one item of select-node information X based on the respective total-number information N that is included in the received replay-result information Ans.

In other words, in the example shown in FIG. 1, the broadcasting apparatus 201 receives the reply-result information Ans from each of the node apparatuses 202a and 202b that are connected in the lower-order layer directly below, and the reply-result information Ans that is sent from node apparatus 202a includes in it, select-node information X, which indicates the node apparatus that was selected from among the node apparatus 202a itself and the node apparatuses 202c, 202d, 202g, 202h, 202i and 202j downstream of node apparatus 202a, and total-number information N (N=6).

Also, the reply-result information Ans that is sent from node apparatus 202b includes in it, select-node information X, which indicates the node apparatus that was selected from among the node apparatus 202b itself and the node apparatuses 202e, 202f, 202k, 202l, 202m, 202n, 202o and 202p downstream of node apparatus 202b, and total-number information N (N=9).

Therefore, the broadcasting apparatus 201 selects one item of select-node information X from among the select-node information X that is included in the reply-result information Ans that is sent from node apparatus 202a, the select-node information X that is included in the reply-result information Ans that is sent from node apparatus 202b, based on the total-number information N that is included in the reply-result information Ans from both.

With this kind of construction, when selecting one item of select-node information X from among the sent select-node information X that was included in the reply-result information Ans from the node apparatuses 202a and 202b, which are node apparatuses that are connected in the lower-order layer directly below, it is possible to take into consideration the total-number information N of the node apparatuses 202 that are connected downstream of the node apparatuses 202a and 202b when making the selection, so it is possible for the select-node information X that is generated by all of the node apparatuses 202 to be selected equally. The detailed method of the process for selecting the select-node information X is the same as the method of the reply-information-selection process by the node apparatuses 202, so it will be described layer when explaining the reply-information-selection process by the node apparatuses 202.

[Construction and Function of a Node Apparatus]

Figure 3:
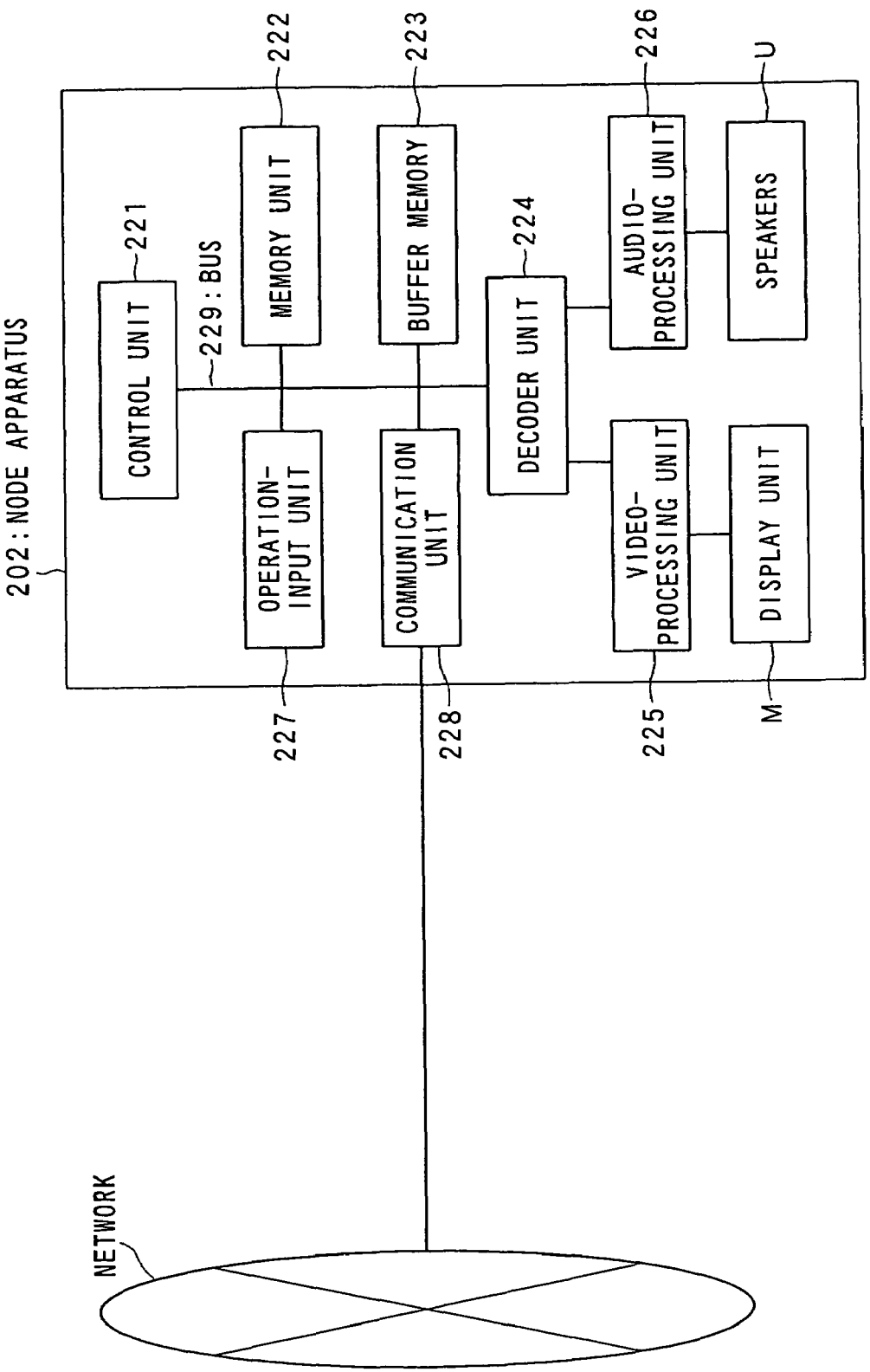
FIG. 3 is a drawing explaining the construction of a node apparatus 202.

Next, FIG. 3 will be used to explain the construction and function of a node apparatus 202.

FIG. 3 is a drawing explaining an example of the construction of a node apparatus 202.

As shown in FIG. 3, each node apparatus 202 comprises: a control unit 221 as a computer that controls each of the components of the node apparatus 202; a memory unit 222 that comprises a magnetic disc or the like that stores various data, tables and programs; a buffer memory 223 that temporarily stores received request-reception data; a decoder unit 224 that decodes encoded video data and audio data that is included in the request-reception data; a video-processing unit 225 that performs specified graphic processing of the decoded video data and outputs that data as a video signal; a display unit M such as a CRT, liquid-crystal display or the like that displays video images based on the video signal that is output from the video-processing unit 225; an audio-processing unit 226 that converts (D/A conversion) the decoded digital audio data to an analog audio signal, after which it amplifies the signal by way of an amplifier and outputs the result; an operation-input unit 227 that is operated by a user for making requests; and a communication unit 228 that performs communication control over a network between the node apparatus 202 and a broadcasting apparatus 201 or another node apparatus 202; and is such that the control unit 221, memory unit 222, buffer memory 223, decoder unit 224, operation-input unit 227 and communication unit 228 are connected to each other via a bus 219.

The control unit 221 comprises a CPU (Central Processing Unit) (not shown in the figure), working RAM (Random Access Memory), ROM (Read Only Memory) that stores various control programs including processing programs, and various data, and a oscillation circuit, and based on operation signals from the operation unit (not shown in the figure), generates control information for controlling each of the components that execute the operation corresponding to the operation information included in the operation signal, and outputs that control information via the bus 219 to the appropriate components to perform overall control of the operation of those components. Also, by executing programs that are stored in ROM or the like, the control unit 221 functions as the inquiry-information-receiving means, inquiry-information-transfer means, reply-result-information-receiving means, reply-information-creation means, reply-results-information-creation means, reply-results-information-reply means, selection means, total-number-information-acquisition means, total-number-information-transmission means, end-information-receiving means, answer-information-input-receiving means, and wait-time-setting means of this invention.

More specifically, when the CPU of the control unit 221 executes a program stored in the memory unit 222 or the like, the control unit 221 functions together with the communication unit 228 as the inquiry-information-receiving means and receives via the communication unit 228 request-reception data that is sent from the broadcasting apparatus 201, or that is transferred from a node apparatus 202 that is connected in the higher-order layer directly above (for example, in FIG. 1, a node apparatus 202 that is connected in the higher-order layer directly above node apparatus 202c is node apparatus 202a), and together with storing that data in the buffer memory 223, reads that request-reception data from the buffer memory 223, then has the decoder unit 224 decode the video data and audio data included in that data and output the video data to the video-processing unit 225 and output the audio data to the audio-processing unit 227.

Furthermore, together with the communication unit 228, the control unit 221 (except in the node apparatuses 202g to 202p of the lowest-order layer) functions as the inquiry-information-transfer means, and transfers via the communication unit 228 request-reception data that was sent from a node apparatus 202 that is connected in the higher-order layer directly above to a node apparatus 202 that is connected in the lower-order layer directly below.

In other words, in the example shown in FIG. 1, the node apparatuses 202 that are connected in the lower-order layer directly below node apparatus 202a are node apparatuses 202c and 202d, so when node apparatus 202a receives request-reception data from the broadcasting apparatus 201, it transfers that request-reception data to node apparatuses 202c and 202d.

Also, the node apparatuses 202 that are connected in the lower-order layer directly below node apparatus 202c are node apparatuses 202g to 202i, so when node apparatus 202c receives request-reception data from node apparatus 202a that is connected in the higher-order layer, it transfers that request-reception data to node apparatuses 202g to 202i.

In this ways, request-reception data that is sent from the broadcasting apparatus 201 is transferred in order to the lowest-order node apparatuses 202g to 202p.

Here, similar to the broadcasting apparatus 201 described above, the control unit 221 references a connection-state table that is stored in the memory unit 222 to determine the transfer destination of the request-reception data. This connection-state table includes at least the IP addresses of that node apparatus 202 and the node apparatuses 202 to which it is connected.

Moreover, together with the control unit 221, the operation-input unit 227 functions as the answer-information-input-receiving means, and it comprises a request button, operation bar, keyboard, and the like, and from the time that the request-reception-begin data Rb that is received by way of the communication unit 228 is reproduced and output by the speaker U or display unit M until the request-reception-end data Re is received, the operation-input unit 227 receives request input from the user as answer information.

Also, the control unit 221 functions as the reply-information-creation means, and based on an input request, creates select-node information X as an example of the reply information in this invention, and temporarily stores that information in the memory unit 222.

Moreover, together with the communication unit 228, the control unit 221 functions as the reply-result-information-receiving means, and receives select-node information X that is sent from each of the node apparatuses 202 that are connected in the lower-order layer directly below as reply-result information Ans. Also, the control unit 221 functions as the wait-time-setting means, and after a timeout time To (described later) has passed, receives the reply-result information Ans that is sent from each of the node apparatuses 202 that are connected in the lower-order layer directly below.

Moreover, the control unit 221 functions as the reply-result-information-creation means, and based on the select-node information X that is sent from each of the node apparatuses 202 that are connected in the lower-order layer directly below as reply-result information Ans, and the select-node information X created by itself, creates new reply-result information Ans.

Furthermore, together with the communication unit 228, the control unit 221 functions as the reply-result-information-reply means, and transfers (sends) the created reply-result information Ans to the node apparatus 202 that is connected in the higher-order layer directly above. Node apparatuses 202a and 202b transfer (send) newly created reply-result information Ans to the broadcasting apparatus 201.

In other words, when a node apparatus 202, except for the node apparatuses 202g to 202p of the lowest-order layer, receives reply-result information Ans by way of the communication unit 228 from the respective node apparatuses 202 that are connected in the lower-order layer directly below, it selects, according to control from the control unit 221, one item of select-node information X from among all of the items of select-node information X that were included in the received reply-result information Ans, and the select-node information X that was created by that node apparatus 202 itself. When doing this, it selects one item of select-node information X based on each item of total-number information N that was included in the received reply-result information Ans.

Also, the control unit 221 creates new reply-result information Ans that includes the selected select-node information X, and total-number information N that indicates how many items of select-node information X that that select-node information was selected from.

The lowest-order node apparatuses 202g to 202p have no reply-result information Ans from downstream node apparatuses, so they create reply-result information Ans in which the select-node information X that was created by the node apparatus 202 itself is selected, and the total-number information N counts only that apparatus itself.

By doing this, in the broadcasting apparatus 201 it is possible to know how many items of select-node information X the items of select-node information X that are included in the reply-result information Ans sent from both node apparatus 202a and node apparatus 202b are selected from, and based on that amount it becomes possible to equally select one of the items of select-node information X. The method for generating reply-result information Ans will be described in detail later.

It is not necessary for the node apparatus 202 to comprise of all or part of the components: decoder unit 224, video-processing unit 225, display unit M, audio-processing unit 226 and speaker U, that were given as components of the node apparatus 202, and construction can be such that another apparatus (for example a television receiver, personal computer, etc.) that is connection to the node apparatus 202 via a coaxial cable, LAN (Local Area Network) cable or the like comprises these components.

[Request-Reception-Data-Transmission Process by a Broadcasting Apparatus]

First, the process for transmitting request-reception data by the broadcasting apparatus 201 of this invention will be explained in detail.

The process of sending request-reception data from the broadcasting apparatus 201 to node apparatuses 202, and the process of receiving reply-result information Ans from the node apparatuses 202 will be explained using FIG. 1 to FIG. 5.

Figure 4:
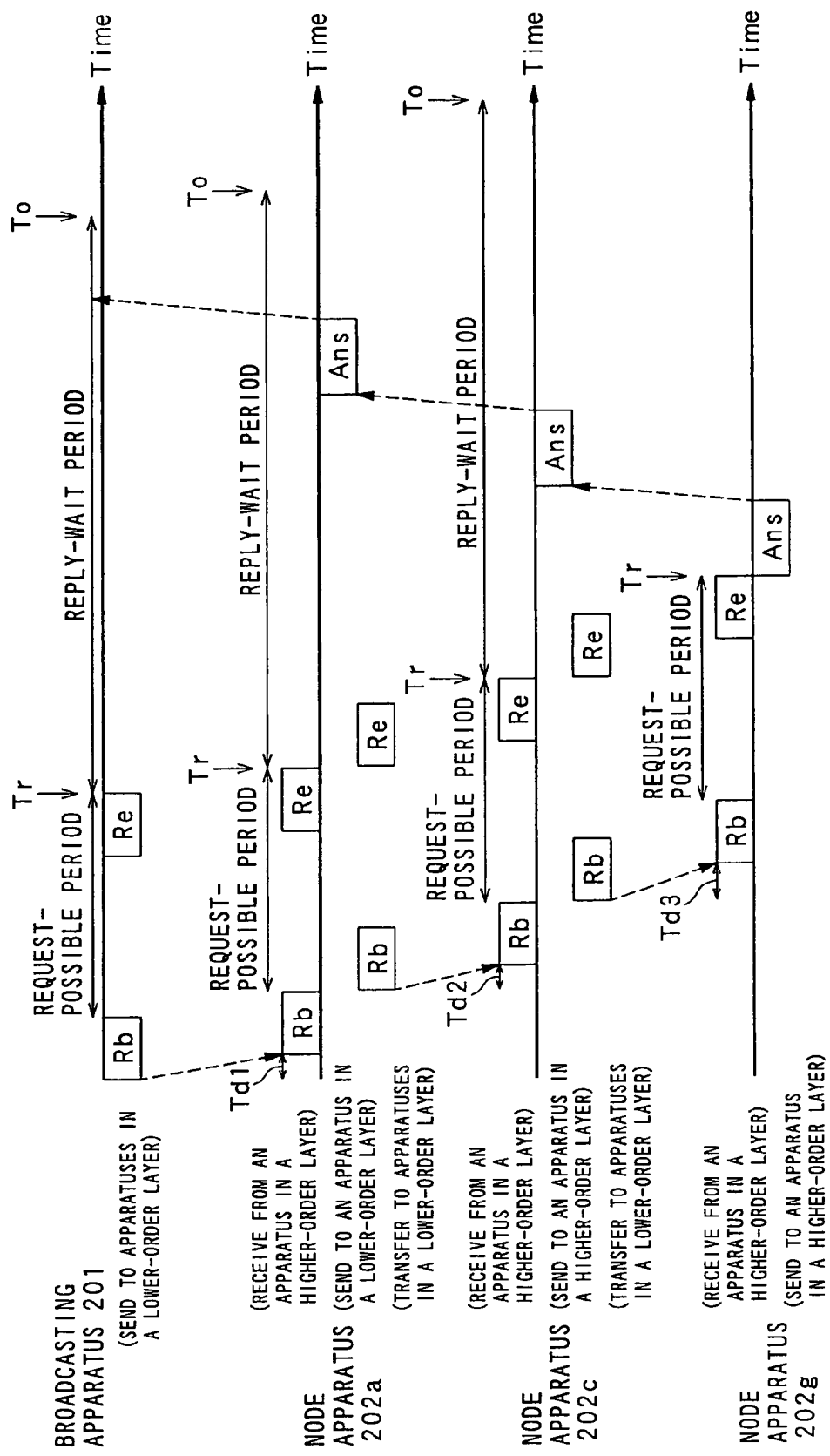
FIG. 4 is a drawing explaining the sending and receiving of request-reception data and reply-result information Ans between a broadcasting apparatus 201 and node apparatus 202.

FIG. 4 is a drawing explaining the sending and receiving of request-reception data and reply-result information Ans between the broadcasting apparatus 201 and node apparatuses 202, where in the same drawing, various kinds of data are sent and received between the broadcasting apparatus 201 and node apparatus 202a, node apparatus 202c and node apparatus 202g.

Figure 5:
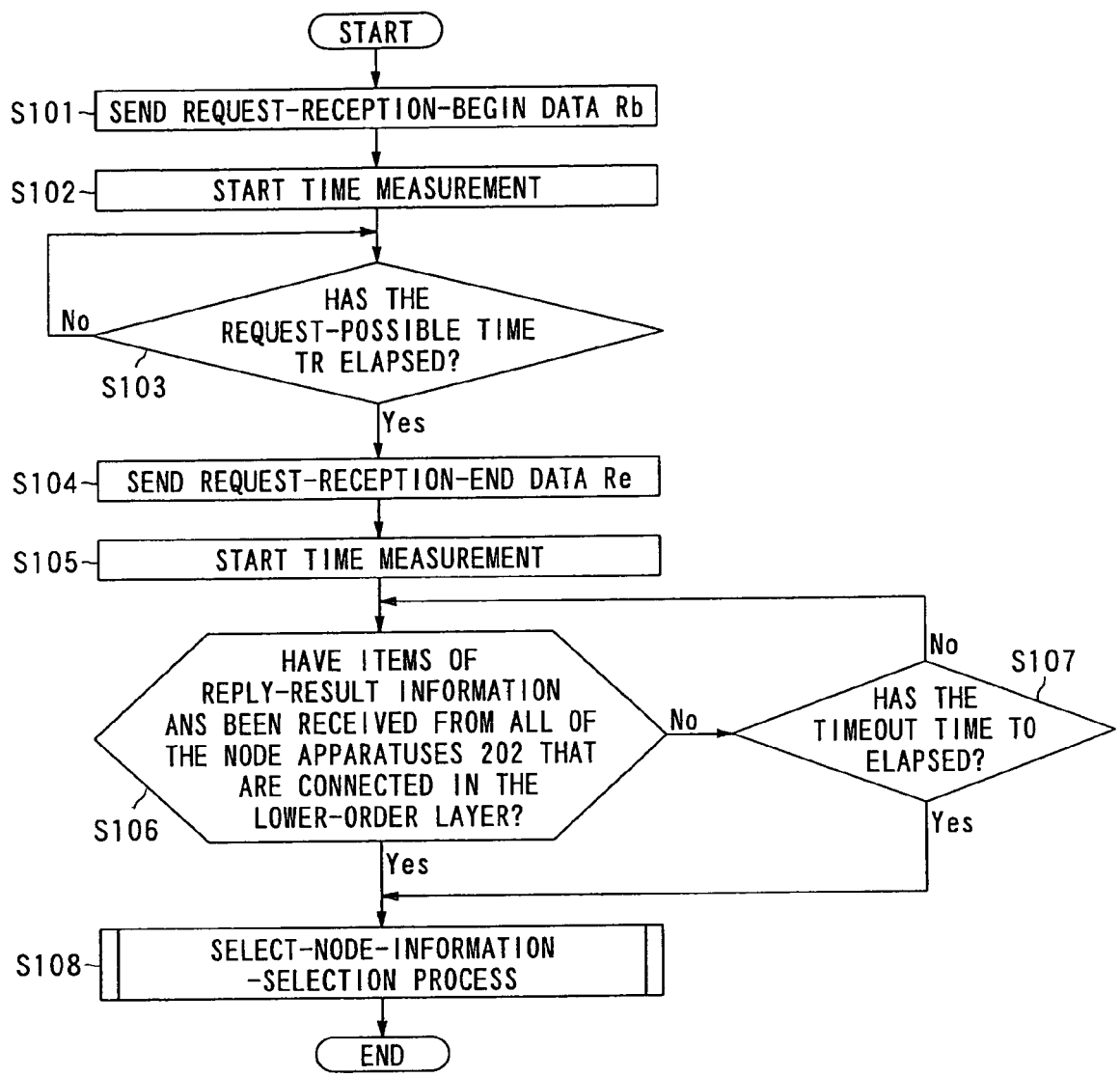
FIG. 5 is a flowchart showing the request-reception-data-transmission process performed by a control unit 211 of a broadcasting apparatus 201.

FIG. 5 is a flowchart of the process performed by the 211 of the broadcasting apparatus 201 for sending request-reception data, where the process shown in the flowchart is executed according to control from the control unit 211 based on a program that is stored beforehand in ROM (not shown in the figure) inside the control unit 211.

The process shown in FIG. 5 is begun by an instruction to send request-reception-begin data Rb that is given by an operator of the broadcasting apparatus 201 such as a disc jockey that operations the operation-input unit 213. Also, at this time, the operator enters the request-possible period Tr (for example 1 minute or 1 hour), and stores it in RAM (not shown in the figure) of the control unit.

First, the broadcasting apparatus 201 sends request-reception-begin data Rb to the node apparatuses 202 that are connected in the lower-order layer directly below (step S101). In the example shown in FIG. 1, the request-reception-begin data Rb is sent to the node apparatuses 202a and 202b that are connected in the lower-order layer directly below.

Also, the broadcasting apparatus 201 uses the internal clock that is equipped in the broadcasting apparatus 201 to begin measuring the time (step S102). Next, the broadcasting apparatus 201 determines whether or not the request-possible period Tr that was stored in the RAM of the control unit 211 has elapsed (step S103), and when it determines that the request-possible period Tr has not yet elapsed (step S103: No), it repeats the processing of that step S103. In other words, the broadcasting apparatus 201 waits for the request-possible period Tr to elapse before going to the next process.

On the other hand, when the broadcasting apparatus 201 determines that the request-possible period Tr has elapsed (step S103: Yes), it sends request-reception-end data Re to the node apparatuses 202 that are connected in the lower-order layer directly below (in the example shown in FIG. 1, node apparatuses 202a and 202b) (step S104).

In the example shown in FIG. 4, after request-reception-begin data Rb has been sent from the broadcasting apparatus 201 to node apparatus 202a, the broadcasting apparatus 201 sends request-reception-end data to node apparatus 202a only after the request-possible period Tr has elapsed.

When doing this, depending on the communication load between the broadcasting apparatus 201, node apparatus 202a, node apparatus 202c and node apparatus 202g, transmission delay times Td1, Td2 and Td3 occur in the data communication, respectively, however, construction is such that the broadcasting apparatus 201 individually sends (distributes) request-reception-end data Re to each of the node apparatuses 202 indicating the end of the request-possible period Tr during which request input can be received, so it is possible for each of the node apparatuses 202 as well to accurately maintain the request-possible period Tr that is set by broadcasting apparatus 201.

Next, the broadcasting apparatus 201 starts time measurement again (step S105).

Next, the broadcasting apparatus 201 determines whether or not reply-result information Ans has been received from all of the node apparatuses 202 that are connected in the lower-order layer directly below (step S106). When as a result of this judgment, it is determined that reply-result information Ans has not been received from all of the node apparatuses 202 that are connected in the lower-order layer directly below (step S106: No), the broadcasting apparatus 201 determines whether or not a preset timeout time To has elapsed (step S107), and when the timeout time To has not yet elapsed (step S107: No), processing returns to step S106.

On the other hand, when as a result of the judgment in step S106, it is determined that reply-result information Ans has been received from all of the node apparatuses 202 that are connected in the lower-order layer directly below (step S106: Yes), or when as a result of the judgment in step S107 it is determined that the timeout time To has elapsed (step S107: Yes), the broadcasting apparatus 201 performs the select-node-information-selection process (step S108).

The method for performing the select-node-information-selection process is the same as that of the select-node-information-selection process by the node apparatuses 202, so will be explained in detail later.

[Reply-Result-Information-Transmission Process by a Node Apparatus]

Next, the process of sending reply-result information by a node apparatus 202 of this invention will be explained in detail using FIG. 1 to FIG. 7.

Figure 6:
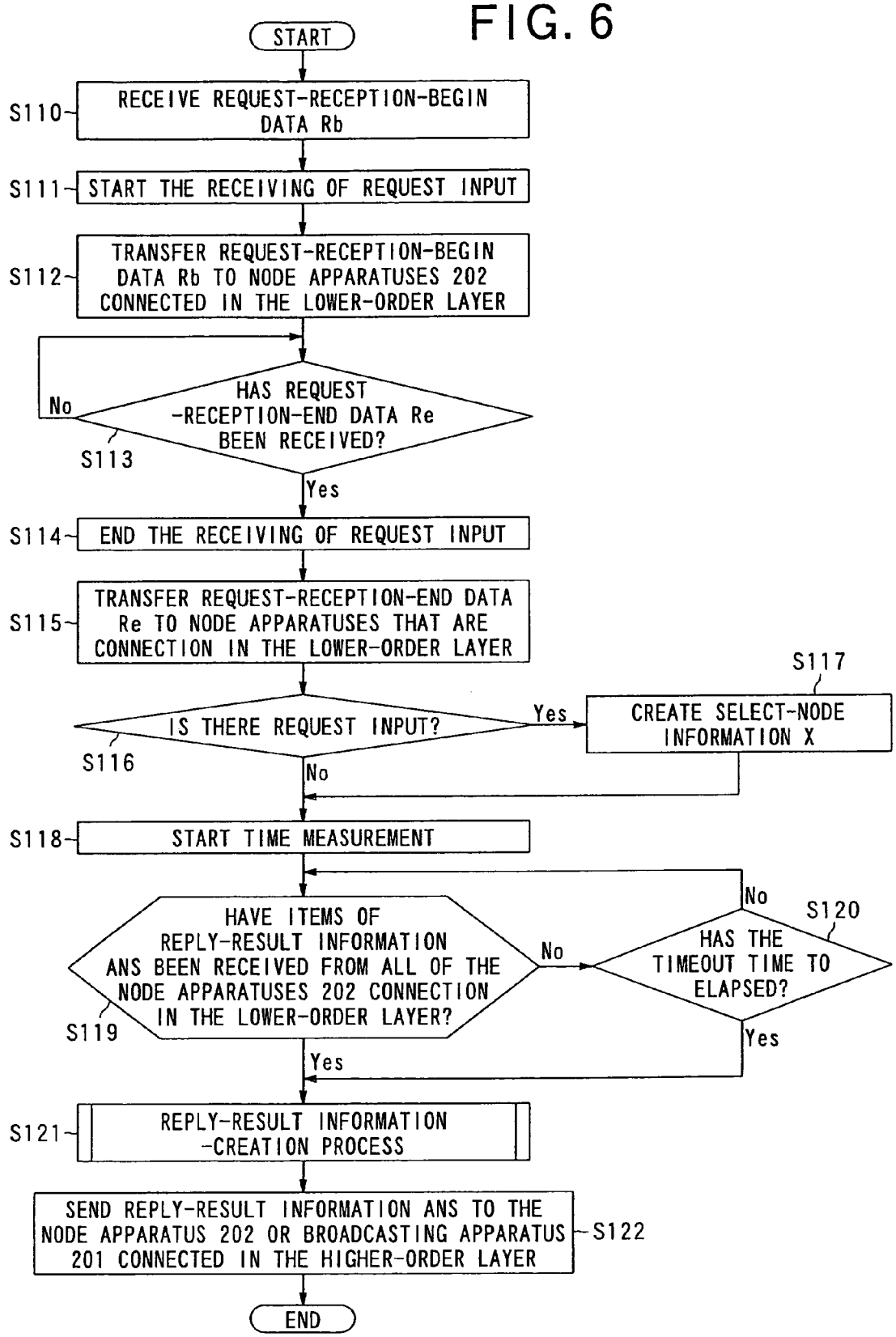
FIG. 6 is a flowchart showing the reply-result-information-transmission process that is performed by a control unit 221 of a node apparatus 202.

FIG. 6 is a flowchart showing the reply-result-information-transmission process that is performed by the 221 of a node apparatus 202. Here, the method of creating new reply-result information Ans based on the reply-result information Ans that was sent from node apparatuses 202 that are connected in the lower-order layer directly below, and select-node information X that was created by the node apparatus itself, and sending that newly created reply-result information Ans to a node apparatus 202 or to the broadcasting apparatus 201 that is connected in the higher-order layer, is explained. Therefore, except for node apparatuses 202g to 202p, which are of the lowest-order layer, the processing of step S118 to step S120 of this process, is processing that is performed by node apparatuses 202a to 202f.

First, when request-reception-begin data Rb is received from the broadcasting apparatus 201 or from a node apparatus 202 that is connected in the higher-order layer directly above (step S110), the node apparatus 202 begins receiving request input (step S111). More specifically, after the decoder unit 224 decodes the received request-reception-begin data Rb and specified output processing has been performed by the video-processing unit 225 and/or audio-processing unit 226, a combined video and audio message, such as 'Viewers (or listeners) having a request, please press the request button.', is output from the display unit M and/or speaker U, and when the user desires to make a request, the user operates the operation-input unit 227 to place that request.

The node apparatus 202 also transfers the request-reception-begin data Rb to node apparatuses 202 that are connected in the lower-order layer directly below by way of communication unit 228 (step S12). In the example shown in FIG. 1, node apparatus 202a transfers the request-reception-begin data Rb to node apparatus 202c, and node apparatus 202c transfers it to node apparatuses 202g to 202i.

Next, the node apparatus 202 uses ID code that is attached to the request-reception data to determine whether or not request-reception-end data Re has been received (step S113). When the node apparatus 202 determines that request-reception-end data Re has not yet been received (step S113: No), it repeats the processing of step S113. In other words, it waits until the request-reception-end data Re has been received before performing the next process.

On the other hand, when the node apparatus determines that the request-reception-end data Re has been received (step S113: Yes), it ends receiving request input (step S114). More specifically, after the decoder unit 224 decodes the received request-reception-end data Re and specified processing has been performed by the video-processing unit 225 and/or audio-processing unit 226, a combined video and audio message, such as 'The receiving of requests has ended. Thank you very much.', is output from the display unit M and/or speaker U, and the user stops using the operation-input unit 227 to make requests. Also, even though the user may operate the operation-input unit 227, control is performed at the step when the request-reception-end data Re is received to stop receiving request input.

Moreover, the node apparatus 202 transfers the request-reception-end data Re to the node apparatuses that are connected in the lower-order layer directly below by way of the communication unit 228 (step S115). In the example shown in FIG. 1, node apparatus 202a transfers the request-reception-end data Re to node apparatus 202c, and node apparatus 202c transfers the request-reception-end data Re to node apparatuses 202g to 202i.

Also, the node apparatus 202 determines whether or not there is request input from after the time that receiving of request input begins in step S11 until the time that receiving of request input ends in step S114 (step S116). When as a result of the judgment it is determined that there was no request input (step S116: No), processing moves to step S118. However, when as a result of judgment it is determined that there was request input (step S116: Yes), the node apparatus 202 creates select-node information X that indicates that there was a request (step S117). The select-node information X that was created by the node itself is used when performing the reply-result-information-creation process described later, so it is stored in the memory unit 222. When there was no request input in step S116, select-node information for the node apparatus itself is not created.

Also, the node apparatus 202 uses the internal clock of the node apparatus 202 to start measuring time (step S118).

Next, the node apparatus 202 determines whether or not reply-result information Ans has been received from all of the node apparatuses 202 that are connected in the lower-order layer directly below (step S119). When as a result of judgment, the node apparatus 202 determines that reply-result information Ans has not been received from all of the node apparatuses 202 connected in the lower-order layer directly below (step S119: No), it determines whether or not a timeout time To that was set in advance as a receiving-wait time has elapsed (step S120), and when it determines that the timeout time To has not yet elapsed (step S120: No), it returns to step S119.

On the other hand, when as a result of the judgment in step S119, the node apparatus 202 determines that reply-result information Ans has been received from all of the node apparatuses 202 that are connected in the lower-order layer directly below (step S119: Yes), or, when as a result of the judgment in step S120, determines that the timeout time To has elapsed (step S120: Yes), it performs the reply-result-information-creation process based on the reply-result information Ans that was received in time (step S121). In the case where there are no node apparatuses 202 connected in the lower-order layer directly below, the node apparatus 202 does not execute steps S118 to S120.

Also, total-number information N and select-node information X selected by the node apparatuses 202 that are connected in the lower-order layer directly below are included in the reply-result information Ans that is sent from the node apparatuses 202 that are connected in the lower-order layer directly below, and as shown in FIG. 7, a plurality of these items of reply-result information Ans are saved in the memory unit 222. In other words, in the case where there are k number of node apparatuses 202 that are connected in the lower-order layer directly below, k number of items of total-number information N and items of select-node information X are correlated and saved in the memory unit 222.

Also, the node apparatus 202 sends the reply-result information Ans that is created in the reply-result-information-creation process to be described later to the node apparatus 202 that is connected in the higher-order layer directly above (node apparatuses 202a and 202b send reply-result information Ans to the broadcasting apparatus 201) (step S122), and then ends processing.

[Reply-Result-Information-Creation Process]

Next, the reply-result-information process of step S121 mentioned above will be explained.

Figure 8:
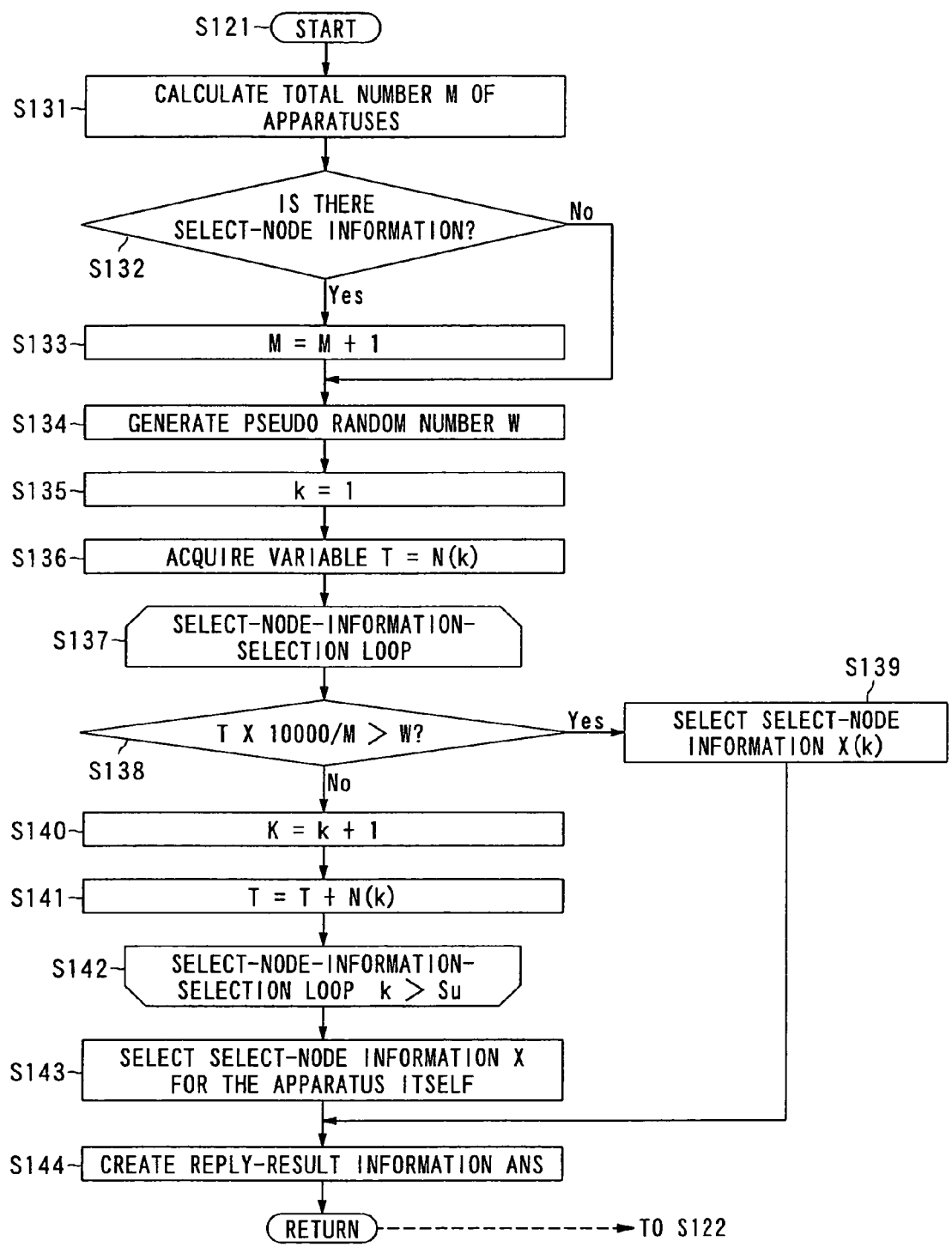
FIG. 8 is a flowchart showing the reply-result-information-generation process by the control unit 221 of a node 202.

FIG. 8 is a flowchart showing the reply-result-information-creation process that is performed by the control unit 221 of a node apparatus 202. In the explanation below, it is supposed that the node apparatuses 202g to 202p of the lowest-order layer have made requests, and in that case, the node apparatuses 202g to 202p of the lowest-order layer create reply-result information Ans as the select-node information X created by the node apparatus itself, and total-number information N as 1, and send that information to the respective node apparatuses 202c to 202f that are connected in the higher-order layer directly above.

First, based on the reply-result information Ans that is sent from each of the node apparatuses 202 that are connected in the lower-order layer directly below, the node apparatus 202 calculates the total number of apparatuses M in the lower-order layers below that node apparatus 202 (step S131).

In other words, as shown in FIG. 7, the node apparatus 202 totals all of the total-number information N1, N2, N3, N3, ... N(k) that is stored in the memory unit 222 to obtain the total number of apparatuses M.

Figure 9:
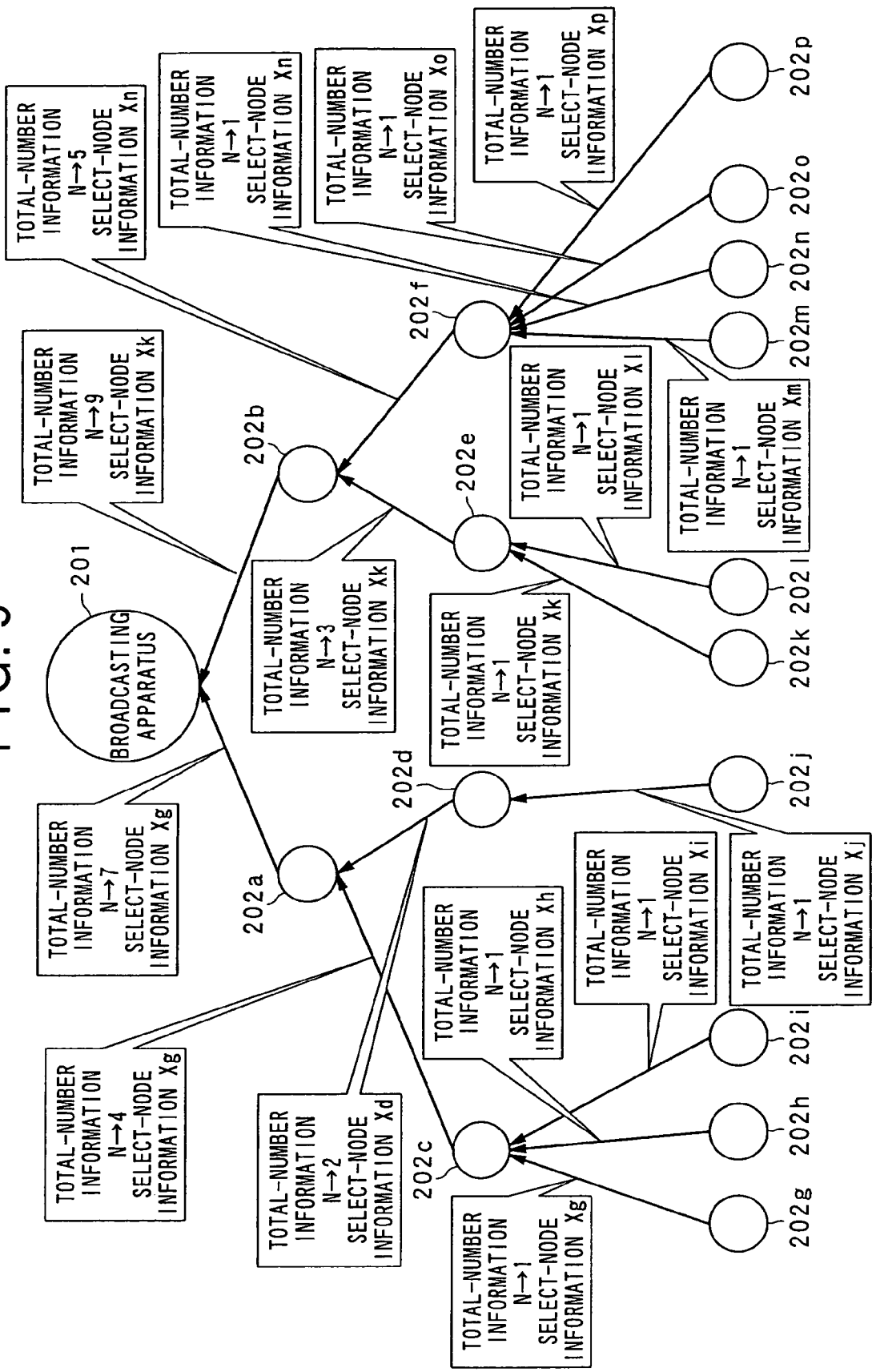
FIG. 9 is a drawing explaining the transmission process for sending reply-result information Ans to a broadcasting apparatus 201 in a tree-type network system S.

Here, FIG. 9 will be used to explain the total-number information N in more detail.

First, node apparatus 202c sends one item of select-node information X that it selected from among the select-node information X that was included in the reply-result information Ans that was sent from each of the node apparatuses 202 that are connected in the lower-order layer directly below (in the example shown in FIG. 9, node apparatuses 202g, 202h and 202i) and the select-node information X that node apparatus 202c created itself, and the total-number information N to node apparatus 202a as reply-result information Ans. Here, the total-number information N is the total number of node apparatuses 202 that are connected below the node apparatus 202c itself (3 in the example shown in FIG. 9) added to the number '1' for itself (the total is 4 in the example shown in FIG. 9).

Also, similarly, node apparatus 202d sends one item of select-node information X that it selected from among the select-node information X that was included in the reply-result information Ans that was sent from the node apparatus 202 that is connected in the lower-order layer directly below (in the example shown in FIG. 9, node apparatus 202j), the select-node information X that node apparatus 202d created itself, and the total-number information N to node apparatus 202a as reply-result information Ans. Here, the total-number information N is the total number of node apparatuses 202 that are connected below the node apparatus 202d itself (1 in the example shown in FIG. 9) added to the number '1' for itself (the total is 2 in the example shown in FIG. 9).

By doing this, it is possible for node apparatus 202a, which received the respective items of reply-result information Ans from node apparatus 202c and node apparatus 202d, to know from the respective total-number information N how many items of select-node information X that the items of select-node information X, which were included in the respective items of reply-result information Ans that were sent from node apparatus 202c and node apparatus 202d, were selected from; and based on that can fairly select one item of select-node information X. The method of selecting select-node information X will be described in detail later.

For example, together with selecting select-node information Xg that was included in the reply-result information Ans that was sent from node apparatus 202g, node apparatus 202c obtains the total-number information as 4, and sends these to node apparatus 202a as reply-result information Ans.

On the other hand, in the case where node apparatus 202d selects select-node information Xd that it created itself, then together with that select-node information Xd, it obtains the total-number information N as 2 (node apparatus 202d and node apparatus 202j), and sends these to node apparatus 202a as reply-result information Ans.

By doing so, based on the items of reply-result information Ans that were sent from node apparatus 202c and node apparatus 202d that are connected in the lower-order layer directly below, the node apparatus 202a checks according to the items of total-number information N (in the example shown in FIG. 9, the items of total-number information N are 4 and 2) how many items of select-node information X the items of select-node information X (select-node information Xg and Xd in FIG. 9) that were selected by the node apparatus 202c and node apparatus 202d were selected from, and taking into consideration the weight of that, selects an item of select-node information X from among the items of select-node information Xg and Xd that were respectively selected by node apparatus 202c and node apparatus 202d. Also, node apparatus 202a creates reply-result information Ans based on the selected select-node information X (select-node information Xg in FIG. 9) and total-number information N (7 in the example shown in FIG. 9), and sends it to the broadcasting apparatus 201.

In other words, in step S131, a node apparatus 202 references the memory unit 222, and acquires and adds the items of total-number information N that were included in the items of reply-result information Ans that were sent from each of the node apparatuses 202 that are connected in the lower-order layer directly below, and calculates the total number of apparatuses M.

Next, the node apparatus 202 determines whether or not there is select-node information X in the memory unit 222 (step S132). In other words, when there is request input in step S116 described above, select-node information X that was created in step S117 is stored in the memory unit 222, and when there is no request input, there will be no select-node information X in the memory unit 222.

Also, when as a result of the judgment in step S132, it is determined that there is select-node information in the memory unit 222 (step S132: Yes), the node apparatus 202 adds one for itself to the total number of apparatuses M (step S133). However, when it is determined that there is no select-node information X in the memory unit 222 (step S132: No), the node apparatus 202 moves on to step S134.

The node apparatus 202 generates a pseudo random number W between 0 and 9999 (step S134). Also, the value 'k', which indicates the node apparatuses 202 that are connected in the lower-order layer directly below is initialized to '1' (step S135). Next, the total-number information N(k) that was sent from the kth node apparatus 202 of the node apparatuses 202 that are connected in the lower-order layer directly below is acquired as variable T (step S136).

Also, the node apparatus 202 selects select-node information based on the total-number information (step S137 to step S142).

First, the node apparatus 202 determines whether or not the pseudo random number W that was generated in step S134 is less than T×10000/M (step S138). When as a result of the judgment it is determined that the pseudo random number W is less than T×10000/M (step S138: Yes), node apparatus 202 selects select-node information X(k) (step S139).

For example, the case of performing processing by node apparatus 202a shown in FIG. 9 will be explained. Total-number information N(1)=4 and select-node information Xg that are included in the reply-result information Ans that was sent from node apparatus 202c, and total-number information N(2)=2 and select-node information Xd that were sent from node apparatus 202d are stored in the memory unit 222.

After that, supposing that in the processing of step S133 node apparatus 202a had select-node information in the memory unit 222, the explanation continues with the total number of apparatuses M acquired as being N(1)+N(2)+1=4+2+1=7.

Next, in the processing of step S136, first, variable T is acquired as being N(1), or in other words 4.

Therefore, in the judgment of step S138, T×10000/M is calculated as 4×10000/7=5714.286.

In other words, when the pseudo random number W generated in step S134 is 0 to 5713, the select-node information Xg that was sent from node-apparatus 202c is selected by node apparatus 202a as select-node information Xg.

On the other hand, when the pseudo random number is 5714 or greater, node apparatus 202a moves to the processing of step S140.

Next, node apparatus 202 adds one to the value 'k' that indicates the node apparatus 202 (step S140), and obtains a new variable T (step S141). In other words, in the example shown in FIG. 9, node apparatus 202a obtains as the variable T=N(1)+N(2)=4+2=6. Also, the node apparatus 202 returns to the processing of step S137 (step S142) and repeats steps S137 to S142 until the value 'k' exceeds the number of node apparatuses Su that are connected in the lower-order layer directly below, and ends the loop when 'k' exceeds the number Su.

When it is not possible to select one item of select-node information X in step S137 to step S142, the node apparatus 202 selects the select-node information X that it created itself (step S143).

Also, together with obtaining the select-node information X that was selected in step S139 or step S143, the node apparatus 202 acquires the total number of apparatuses M as the total-number information N, then creates reply-result information Ans with these (step S144) and ends processing.

In other words, in the example shown in FIG. 9, in the processing of the first loop for selecting select-node information described above, when the pseudo number W generated in step S134 is between 0 to 5713, node apparatus 202a selects the select-node information Xg that was sent from node apparatus 202c as the select-node information. When this is not the case, then in the processing of the second loop for selecting select-node information, T×10000/M is calculated as being (4+2)×10000/7=8571.429, so when the pseudo random number W that was generated in step S134 is between 5714 to 8570, node apparatus 202a selects the select-node information Xd that was sent from node apparatus 202d as the select-node information.

When this is not the case (in other words, when the pseudo random number W is 8571 or greater), then node apparatus 202a selects the select-node information Xa that it created itself in step S143. In other words, the probability that node apparatus 202a will select node apparatus 202g that was selected by node apparatus 202c having a large value for total-number information N is larger than the probability of selecting node apparatus 202d that is selected by node apparatus 202d having a small value for total-number information N. That is, the probability that select-node information Xg that was sent from node apparatus 202c will be selected is 5713/1000=4/7, and the probability that select-node information Xd that was sent from node apparatus 202d will be selected is (8570−5713)/10000=2/7, and the probability that the select-node information Xa that was created by node apparatus 202a will be selected is (9999−8570)/10000=1/7. As a result, construction is possible in which the items of select-node information X that are generated by all of the node apparatuses 202 participating in the tree-type network system are selected equally.

With the embodiment of the invention described above, construction is such that select-node information X is received from the node apparatuses 202 that are connected in the lower-order layer directly below as reply-result information Ans, and new reply-result information Ans is created based on that reply-result information Ans and then sent to the node apparatus 202 (or broadcasting apparatus 201) that is connected in the higher-order layer directly above, so it is possible to reduce concentration of load (access) in upstream communication paths of the network (for example a certain router IP) and in upstream node apparatuses 202, and thus it is possible to improve the operating efficiency of the system.

Also, when the broadcasting apparatus 201, which makes an inquiry such as a request, asks for requests, and the broadcasting apparatus 201 selects one of the items of select-node information X from among the items of select-node information X that were sent from downstream node apparatuses 202, construction is such that when each node apparatus 202 receives items of select-node information X from each of the node apparatuses that are connected in the lower-order layer directly below as reply-result information Ans, and creates new reply-result information Ans based on that reply-result information Ans, each node apparatus 202 selects select-node information X, then creates reply-result information Ans that includes that selected select-node information X and sends it to the node apparatus 202 that is connected in the higher-order layer directly above, so the broadcasting apparatus 201 only needs to select one item of select-node information X from the items of select-node information X that were sent from the node apparatuses 202 that are connected in the lower-order layer directly below (node apparatuses 202a and 202b in the example shown in the FIG. 9), so selection of the select-node information can be performed more efficiently.

Furthermore, when selecting one item of select-node information X from among the items of select-node information X from the node apparatuses 202 that are connected in the lower-order layer directly below and the select-node information X created by the node apparatus itself, and then sending it to the node apparatus 202 that is connected in the higher-order layer directly above, total-number information N, which indicates how many items of select-node information X that the selected select-node information X was selected from, is also included in the reply-result information Ans, so construction is such that when selecting one item of select-node information X from the items of select-node information X that are included in the items of reply-result-information Ans that are sent from the node apparatuses 202 that are connected in the lower-order layer directly below, it is possible to select one item of select-node information taking into consideration its weight, so that the items of select-node information X that are created by all of the node apparatuses 202 are selected equally.

The select-node-information-selection process that is performed by the broadcasting apparatus 201 in step S108 is the same as the select-node-information-selection process that is performed by the node apparatuses 202 as described above, so when the broadcasting apparatus 2 finally selects one item of select-node information, construction is such that it is possible to perform selection equally from the items of select-node information that are created by all of the node apparatuses participating in the tree-type network system S.

In the embodiment described above, the timeout time To in step S107 and the timeout time To in step S120 are set the same, however, the invention is not limited to this, and it is possible to suitably change the settings according to the connect ion state of the node apparatuses (ISP, DSL, etc.), the performance of the apparatuses, or the like.

Also, in the embodiment described above, request-reception data was sent to the node apparatuses 202 as multimedia information, however, the invention is not limited to this, and it is also possible to send it a simply a marker signal. In other words, request-reception-start data Rb is sent as a starting marker to indicate the start of the reception of request input, and request-reception-end data Re is sent as an ending marker indicating the end of the reception of request input. In this case, the node apparatuses 202 that receive these signals can be such that they reproduce and output images and audio that indicated the start (or the end) of the reception of request input.

Moreover, in the embodiment described above, the node apparatuses 202g to 202p of the lowest-order layer were explained as performing requests properly, however, when a user does not press the request button for example, the select-node information X for that node apparatus itself is not generated, (or information indication 'nothing has been selected' is generated) and information indicating that there is no select-node information in the reply-result information Ans and that the total-number information N is '0' is sent.

Furthermore, the contents of the request-reception-start data Rb that is sent from the broadcasting apparatus 201 comprises O×quiz, and by having construction such that together with sending correct-answer information indicating the correct answer along with the request-reception-start data Rb, the control unit 221 of a node apparatus 202 functions as a judgment means and determines whether or not the input from each of the node apparatuses matches the correct answer to the quiz, and when the select-node information X that is created based on that input does not match the correct answer to the quiz, that created select-node information X is removed as an object of selection in the select-node-information-selection process described above. By doing so it is possible to apply this invention to a viewer-participation-type of quiz. In the case where input does not match the correct answer to the quiz, construction can be such that no select-node information X is created.

Also, in the embodiment described above, pseudo random numbers were generated between 0 and 9999, however, when the number of all of the node apparatuses 202 that participate in the tree-type network system S is a larger number (for example, 10,000 or more), in order to reduce the round off error when making the result of the probability calculation an integer, it is possible to use a larger range of random numbers.

Also, in the embodiment described above, one item of select-node information X was selected from among the items of select-node information included in the items of reply-result information Ans that were sent from each of the node apparatuses 202 that are connected in the lower-order layer directly be low, and sent to the node apparatus 202 or broadcasting apparatus 201 that is connected in the higher-order directly above, however, the invention is not limited to this, and construction can be such that a specified number of items of select-node information X be sent. In that case, in the processing of step S134 described above only a specified number of pseudo random numbers are generated, and a select-node-information-selection loop (step S137 to step S143) is performed for each pseudo random number W in order to select a specified number of items of select-node information X and then send that specified number of select-node information X included in the reply-result information Ans.

The present invention is not confined to the configuration listed in the foregoing embodiments, but it is easily understood that the person skilled in the art can modify such configurations into various other modes, within the scope of the present invention described in the claims. The entire disclosures of Japanese Patent Applications No. 2004-205497 filed on Jul. 13, 2004 and Japanese Patent Applications No. 2004-245180 filed on Aug. 25, 2004 including the specification, claims, drawings and summary are incorporated herein by reference in its entirety.

What is claimed is:

1. A processing apparatus in a tree-type network system that comprises an inquiry apparatus that sends inquiry information requesting that reply-result information be sent, and a plurality of processing apparatuses that receive the inquiry information, where the inquiry apparatus is connected to the plurality of processing apparatuses in a tree shape via communication paths so that the inquiry apparatus is the highest and the plurality of processing apparatuses form a plurality of layers, and the inquiry information that is sent from the inquiry apparatus is successively transferred from the processing apparatuses in a higher order to the processing apparatuses in a lower order, wherein one of the processing apparatuses comprises:

an inquiry-information-receiving unit for receiving the inquiry information that is sent from another processing apparatus that is connected in a higher-order layer above the processing apparatus or from the inquiry apparatus;

an inquiry-information-transfer unit for transferring the received inquiry information to one or more of the other processing apparatuses that are connected in a lower-order layer below the processing apparatus;

a reply-result-information-receiving unit for receiving the reply-result information that includes reply information for the received inquiry information and that is sent from at least one or more of the other processing apparatuses that are connected in the lower-order layer;

a reply-information-creation unit for the processing apparatus to create its own reply information for the received inquiry information;

a reply-result-information-creation unit for the processing apparatus to create its own reply-result information based on the reply-result information received by the reply-result-information-receiving unit, and the reply information created by the reply-information-creation unit;

a reply-result-information-reply unit for sending the created reply-result information to another processing apparatus or inquiry apparatus that is connected in a higher-order layer and that is a transmission source of the inquiry information that was received by the inquiry-information-receiving unit; and a selection unit for selecting a specified number of items of the reply information from among the reply information that is included in the reply-result information that is received by the reply-result-information-receiving unit, and the reply information that is created by the reply-result-information-creation unit;

wherein the reply-result-information-creation unit creates the reply-result information that includes the selected specified number of items of the reply information.

2. The processing apparatus of claim 1, further comprising:

a total-number-information-acquisition unit for acquiring a sum of a total number of the other processing apparatuses connected in the lower-order layer plus '1' as total-number information; and a total-number-information-transmission unit for sending the total-number information to the other processing apparatus or the inquiry apparatus that is the transmission source of the received inquiry information that was received by the inquiry-information-receiving unit and that is connected in the higher-order layer;

wherein the selection unit selects the specified number of items of the reply information based on the total-number information that was sent from the other processing apparatuses that are connected in the lower-order layer.

3. The processing apparatus of claim 2, wherein the total-number-information-transmission unit sends the total-number information when the reply-result-information-reply unit sends the reply-result information.

4. The processing apparatus of claim 1, further comprising:

an end-information-receiving unit for receiving end information from the other processing apparatus or from the inquiry apparatus that is connected in the higher-order layer and that gives an instruction to end the receiving of answer information to the inquiry information; and an answer-information-input-receiving unit for receiving input of the answer information from when the received inquiry information is received by the inquiry-information-receiving unit until the end information is received by the end-information-receiving unit; wherein the reply-information-creation unit creates the reply information based on an input of the answer information that is received by the answer-information-input-receiving unit.

5. The processing apparatus of claim 1, further comprising:

a wait-time-setting unit for setting receiving-wait time for receiving the reply-result information from the other processing apparatuses that are connected in the lower-order layer; wherein the reply-result-information-creation unit creates the created reply-result information for the processing apparatus based on the reply-result information that was received by the reply-result-information-receiving unit within the receiving-wait time.

6. The processing apparatus of claim 1, further comprising:

a judgment unit for determining whether or not the reply information that was created by the reply-information-creation unit corresponds to the received inquiry information that was received by the inquiry-information-receiving unit; wherein the selection unit removes the reply information that was created by the reply-information-creation unit as an object of selection when it was determined that the reply information does not correspond with the inquiry information, and selects the specified number of items of reply information only from the reply information that is included in reply-result information that was received by the reply-result-information-receiving unit.

7. A tree-type network system that comprises an inquiry apparatus that sends inquiry information requesting that reply-result information be sent, and a plurality of processing apparatuses that receive the inquiry information, where the inquiry apparatus is connected to the plurality of processing apparatuses in a tree shape via communication paths so that the inquiry apparatus is the highest and the plurality of processing apparatuses form a plurality of layers, and the inquiry information that is sent from the inquiry apparatus is successively transferred from the processing apparatuses in a higher order to the processing apparatuses in a lower order, wherein one of the processing apparatuses comprises:

an inquiry-information-receiving unit for receiving the inquiry information that is sent from another processing apparatus that is connected in a higher-order layer above the processing apparatus or from the inquiry apparatus;

an inquiry-information-transfer unit for transferring the received inquiry information to the other processing apparatuses that are connected in a lower-order layer below the processing apparatus;

a reply-result-information-receiving unit for receiving the reply-result information that includes reply information for the received inquiry information and that is sent from the other processing apparatuses that are connected in the lower-order layer;

a reply-information-creation unit for the processing apparatus to create its own reply information for the received inquiry information;

a reply-result-information-creation unit for the processing apparatus to create its own reply-result information based on the reply-result information received by the reply-result-information-receiving unit, and the reply information created by the reply-information-creation unit;

a reply-result-information-reply unit for sending the created reply-result information to another processing apparatus or to the inquiry apparatus that is connected in a higher-order layer and that is the transmission source of the inquiry information that was received by the inquiry-information-receiving unit; and a selection unit for selecting a specified number of items of the reply information from among the reply information that is included in the reply-result information that is received by the reply-result-information-receiving unit, and the reply information that is created by the reply-result-information-creation unit;

wherein the reply-result-information-creation unit creates the reply-result information that includes the selected specified number of items of the reply information; and wherein the inquiry apparatus comprises:

an inquiry-information-transmission unit for sending the inquiry information to at least one or more of the processing apparatuses that are connected in a lower-order layer below the inquiry apparatus; and a reply-result-information unit for receiving the reply-result information that is sent from at least one or more of the processing apparatuses that are connected in the lower-order layer.

8. The tree-type network system of claim 7, wherein the processing apparatus further comprises:

a total-number-information-acquisition unit for acquiring a sum of a total number of the other processing apparatuses connected in the lower-order layer plus '1' as total-number information; and a total-number-information-transmission unit for sending the total-number information to the other processing apparatus or the inquiry apparatus that is the transmission source of the received inquiry information that was received by the inquiry-information-receiving unit and that is connected in the higher-order layer; and wherein the selection unit selects the specified number of items of the reply information based on the total-number information that was sent from the other processing apparatuses that are connected in the lower-order layer.

9. A computer storage medium storing a computer program for a computer that is contained in a processing apparatus in a tree-type network system that comprises an inquiry apparatus that sends inquiry information requesting that reply-result information be sent, and a plurality of processing apparatuses that receive the inquiry information, where the inquiry apparatus is connected to the plurality of processing apparatuses in a tree shape via communication paths so that the inquiry apparatus is the highest and the plurality of processing apparatuses form a plurality of layers, and the inquiry information that is sent from the inquiry apparatus is successively transferred from the processing apparatuses in a higher order to the processing apparatuses in a lower order, wherein the program makes the computer of the processing apparatuses function as:

an inquiry-information-receiving unit for receiving the inquiry information that is sent from another processing apparatus that is connected in a higher-order layer above the processing apparatus or from the inquiry apparatus;

an inquiry-information-transfer unit for transferring the received inquiry information to one or more of the other processing apparatuses that are connected in a lower-order layer below the processing apparatus;

a reply-result-information-receiving unit for receiving the reply-result information that includes reply information for the received inquiry information and that is sent from at least one or more of the other processing apparatuses that are connected in the lower-order layer;

a reply-information-creation unit for the processing apparatus to create its own reply information for the received inquiry information;

a reply-result-information-creation unit for the processing apparatus to create its own reply-result information based on the reply-result information received by the reply-result-information-receiving unit, and the reply information created by the reply-information-creation unit;

a reply-result-information-reply unit for sending the created reply-result information to another processing apparatus or inquiry apparatus that is connected in a higher-order layer and that is the transmission source of the inquiry information that was received by the inquiry-information-receiving unit; and a selection unit for selecting a specified number of items of the reply information from among the reply information that is included in the reply-result information that is received by the reply-result-information-receiving unit, and the reply information that is created by the reply-result-information-creation unit;

wherein the reply-result-information-creation unit creates the reply-result information that includes the selected specified number of items of the reply information.

10. The medium of claim 9 that further makes the computer function as:

a total-number-information-acquisition unit for acquiring a sum of a total number of the other processing apparatuses connected in the lower-order layer plus '1' as total-number information: and a total-number-information-transmission unit for sending the total-number information to the other processing apparatus or the inquiry apparatus that is the transmission source of inquiry information that was received by the inquiry-information-receiving unit and that is connected in the higher-order layer;

wherein the selection unit select the specified number of items of the reply information based on the total-number information that was sent from the other processing apparatuses that are connected in the lower-order layer.

* * * * *

UNITED STATES PATENT AND TRADEMARK OFFICE
CERTIFICATE OF CORRECTION

| | |
|---|---|
| PATENT NO. | : 7,668,185 B2 |
| APPLICATION NO. | : 11/652530 |
| DATED | : February 23, 2010 |
| INVENTOR(S) | : Yoshihiko Hibino et al. |

It is certified that error appears in the above-identified patent and that said Letters Patent is hereby corrected as shown below:

Title page
Please delete the following:

Item "(73)  Assignee:  Brother Kogyo Kabushiki Kaisha
Nagoya (JP)"

and replace with:

Item (73)  Assignees:  Brother Kogyo Kabushiki Kaisha
Nagoya (JP)

Xing Inc.
Nagoya (JP)

Signed and Sealed this
Twenty-fifth Day of January, 2011

David J. Kappos
*Director of the United States Patent and Trademark Office*